US009195696B2

(12) United States Patent
Smith

(10) Patent No.: US 9,195,696 B2
(45) Date of Patent: Nov. 24, 2015

(54) METHOD AND SYSTEM FOR DATA TRANSFER OPTIMIZATION

(71) Applicant: International Business Machines Corporation, Armonk, NY (US)

(72) Inventor: Ian T. Smith, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/914,709

(22) Filed: Jun. 11, 2013

(65) Prior Publication Data

US 2014/0046917 A1    Feb. 13, 2014

(30) Foreign Application Priority Data

Aug. 7, 2012  (GB) .................................. 1214116.4

(51) Int. Cl.
*G06F 17/00* (2006.01)
*G06F 17/30* (2006.01)

(52) U.S. Cl.
CPC ........ *G06F 17/30321* (2013.01); *G06F 17/303* (2013.01)

(58) Field of Classification Search
CPC .......................... G06F 17/30321; G06F 17/303
USPC .......................................................... 707/696
See application file for complete search history.

(56) References Cited

U.S. PATENT DOCUMENTS

| 6,145,066 | A  | * | 11/2000 | Atkin ............................. 711/165 |
| 6,374,327 | B2 | * | 4/2002  | Sakaki et al. .................. 711/112 |
| 6,571,258 | B1 | * | 5/2003  | Borowsky et al. ..................... 1/1 |
| 6,654,830 | B1 | * | 11/2003 | Taylor et al. ..................... 710/74 |
| 6,898,588 | B2 | * | 5/2005  | Kosciuszko et al. .......... 707/715 |
| 7,143,307 | B1 | * | 11/2006 | Witte et al. ................... 714/6.23 |
| 8,307,177 | B2 | * | 11/2012 | Prahlad et al. ................ 711/162 |
| 8,346,990 | B2 | * | 1/2013  | McKean et al. ................. 710/15 |
| 2002/0082945 | A1 | * | 6/2002  | Tenorio ........................... 705/27 |
| 2005/0283564 | A1 | * | 12/2005 | LeCrone et al. .............. 711/100 |
| 2007/0074217 | A1 | * | 3/2007  | Rakvic et al. .................. 718/102 |
| 2007/0179934 | A1 | * | 8/2007  | Basov et al. ...................... 707/3 |

(Continued)

FOREIGN PATENT DOCUMENTS

| CN | 103577528 A | 2/2014 | |
| GB | 2504716 | * 2/2014 | ................ G06F 3/06 |

OTHER PUBLICATIONS

Das, Sudipto, et al., "Albatross: Lightweight Elasticity in Shared Storage Databases for the Cloud using Live Data Migration", Proc. of the VLDB Endowment, vol. 4, No. 8, © 2011, pp. 494-505.*

(Continued)

*Primary Examiner* — Robert Stevens
(74) *Attorney, Agent, or Firm* — L. Jeffrey Kelly; Feb R. Cabrasawan

(57) ABSTRACT

A data migration system and method for migrating data objects from a source entity to a target entity, wherein the source entity includes infrastructure shared between discrete systems, the system including: a storage device storing an index of the data objects stored on the shared infrastructure and object attributes of the data objects, said index being in a normalized data model independent of native formats of the discrete systems; a selector adapted to select which objects to migrate based on at least one said object attribute; and an optimizer adapted to optimize the migration of data from the shared infrastructure to the target entity.

20 Claims, 10 Drawing Sheets

(56) References Cited

U.S. PATENT DOCUMENTS

2008/0104220 A1* 5/2008 Vanyukhin et al. ............ 709/223
2009/0106409 A1* 4/2009 Murata ........................ 709/223
2009/0282203 A1* 11/2009 Haustein et al. .............. 711/162
2012/0254175 A1* 10/2012 Horowitz et al. ............. 707/737

OTHER PUBLICATIONS

Soundararajan, Gokul, et al., "Online Data Migration for Autonomic Provisioning of Databases in Dynamic Content Web Servers", CASCON '05, IBM Press ©2005, 15 pages.*

Zhang, Gong, et al., "Automated Lookahead Data Migration in SSD-enabled Multi-tiered Storage Systems", MSST 2010, Incline Village, NV, May 3-7, 2010, 6 pages.*

Zhang, Gong, "Data and Application Migration in Cloud Based Data Centers: Architectures and Techniques", PhD Thesis, College of Computing, Georgia Institute of Technology, Atlanta, GA, Aug. 2011, 127 pages.*

Smith, "Method and System for Data Transfer Optimisation," DE Patent Application No. 102013215009.1, filed Jul. 31, 2013, 34 pages.

* cited by examiner

METHOD AND SYSTEM FOR DATA TRANSFER OPTIMIZATION

The present application claims the benefit of priority of United Kingdom Patent Application Serial Number 1214116.4, entitled "METHOD AND SYSTEM FOR DATA TRANSFER OPTIMIZATION", filed Aug. 7, 2012 with the United Kingdom Intellectual Property Office, the contents of which are incorporated by reference herein in its entirety.

BACKGROUND

The present invention relates to an apparatus, system and method for optimizing the transfer of data between a source entity and a target entity.

Organizations are running ever more sophisticated computer systems. For example, a small business with only 30 employees located at a single site may run one or two networks, with a single server. Employees may have different workstations or computers, manufactured by different OEMs and using different operating systems. The types of data created and manipulated by different employees will vary depending on their role, and the software they use.

As the requirements of IT systems grow organically, so the number of workstations, networks, servers and storage devices increases. Moreover, there is increasing variation in the OEM product and IT systems used within an organization. In larger organizations with thousands of employees spread across many sites, there is considerable variation in hardware and software both within and between the sites. Moreover, data retention and protection policies may vary between sites and between departments within (or between) sites. Accordingly, it is becoming increasingly difficult to manage the transfer of data from legacy hardware to replacement equipment as the IT infrastructure is refreshed.

Typically, all (or at least all important) information stored by an organization is backed up overnight or at other regular intervals. There are two primary reasons for backing up data. The first is to recover data after loss. The second is to allow recovery of data from an earlier time according to a user-defined retention policy. Accordingly, backed up data will commonly be given an expiry date setting the time for which the copy of the backed up data should be kept.

Since at least one copy must be made of all data on a computer system that is worth saving, storage requirements can be very large and back up systems can be very complicated. To add to the complexity, there are many different types of storage data that are useful for making back ups, many different back up models, many different access types and many different providers of back up solutions.

Briefly, back ups can be unstructured, which are generally file system type back ups, with a copy of data made on a medium or series of media with minimal information about what was backed up and when, an structured, which generally use product specific formats such as SQL, Oracle and BD2.

Irrespective of whether structured or unstructured, back ups may be: full, in which complete system images are made at various points in time; incremental, in which data is organized into increments of change between different points in time; reverse delta, in which a mirror of the recent source data is kept together with a series of differences between the recent mirror and earlier states; and continuous, in which all changes to data are immediately stored.

In addition, various media can be used for storing data, including magnetic tapes, hard disk, optical storage, floppy disk and solid state storage. Typically, an enterprise will hold its own back up media devices, but remote back up services are becoming more common.

To add a further layer of complexity, back up may be: on-line, in which an internal hard disk or disk array is used; near-line, such as a tape library with a mechanical device to move media units from storage to a drive where the media can be read/written; off-line, in which direct human action is required to make access to the storage media physically possible; off-site; or at a disaster recovery centre.

Moreover, the different back up providers use proprietary systems for organizing back ups. These systems can handle the copying or partial copying of files differently; and they can copy file systems differently, for example by taking a file system dump or by interrogating an archive bit or by using a versioning file system. They may also handle the back up of live data in different ways. In addition to copying file data, back up systems will commonly make a copy of the metadata of a computer system, such as a system description, boot sector, partition layout, file metadata (file permissions, owner, group etc), and system metadata (as different operating systems have different ways of storing configuration information).

In addition, the different back up providers frequently manipulate the data being backed up to optimize the back up speed, the restore speed, data security, media usage and bandwidth requirements. Such manipulation may involve compression, duplication and deduplication, encryption, multiplexing, refactoring and staging, and varies between the different products and different vendors.

It will be apparent that when a number of different back up systems are used, it can be very difficult to properly manage the migration of data from legacy, inefficient tape infrastructure to modern more efficient infrastructure.

Handling large and complex data sets poses a number of challenges when it comes to mobility. In enterprise tape environments that are managed by traditional backup servers and data indexes, there can easily be high levels of contention and performance bottlenecks. This is because the storage resources, which have direct access to the data, are shared between discrete back up systems. These back up systems will access the resources as they require, without an understanding of what other management servers from other vendors are actually doing. Thus, the tape library, available tape drive or individual piece of media may be requested by two separate requestors (for example, back up servers) at the same time. This results in a hung process effectively waiting for the infrastructure to come available to serve the second data request. This condition occurs even if there is available infrastructure to access a different piece of eligible data.

If the underlying resources includes tens of thousands of tape volumes and are shared between many back up servers the complexity is exponential and large scale data access from such a complex environment is near impossible. Whilst this has always been a potential issue, the deluge of data and volumes of unstructured content now being stored have significantly exacerbated the problem.

The present invention is intended to address these problems and provide the ability to control and group large, complex data sets for migration or mobility from source entities to target entities and to optimize the access from an underlying shared infrastructure.

SUMMARY

According to a first aspect of the present invention, there is provided a data migration method for migrating data objects from a source entity to a target entity, wherein the source entity includes infrastructure shared between discrete systems, the method including providing an index of the data objects stored on the shared infrastructure and object attributes of the data objects, the index being provided in a normalized format independent of native formats of the discrete systems, selecting which objects to migrate based on at least one the object attribute, and optimizing the migration of data from the shared infrastructure to the target entity.

Preferably, the at least one object attribute used for selecting which objects to migrate is one of object owner, group owner, data type, and expiration.

Preferably, the object attributes includes at least one of customer data, site data, source data, node data, object data and fragment data.

Preferably, the object data attributes include at least one of time of creation, size, number of files and expiry date.

In a preferred embodiment, the method further includes splitting the migration of objects into a plurality of phases prior to the optimizing the migration, whereby the migration is optimized for each phase.

In this case, it is preferred that the migration is split based on at least one of scheduled start date, object owner, group owner, data type, customer data, and site data.

Preferably, the migration of data is optimized by grouping together objects in migration sets based on the object attributes.

In this case, it is further preferred that the shared infrastructure includes storage media and the migration sets are based on the location of the objects on the storage media, the relationship of the objects to the respective discrete systems, and available access paths for objects from the discrete systems to the shared storage media.

More preferably, objects are ordered sequentially in each migration set based on their locations on the storage media.

Preferably, the migration set allows migration of data across parallel data paths.

According to a second aspect of the present invention, there is provided a data migration system for migrating data objects from a source entity to a target entity, wherein the source entity includes infrastructure shared between discrete systems, the system including a storage device storing an index of the data objects stored on the shared infrastructure and object attributes of the data objects, the index being in a normalized data model independent of native formats of the discrete systems, a selector adapted to select which objects to migrate based on at least one the object attribute, and an optimizer adapted to optimize the migration of data from the shared infrastructure to the target entity.

Preferably, the at least one object attribute used for selecting which objects to migrate is one of object owner, group owner, data type, and expiration.

Preferably, the object attributes includes at least one of customer data, site data, source data, node data, object data and fragment data.

More preferably, the object data attributes include at least one of time of creation, size, number of files and expiry date.

It is preferred that the system further includes an organizer for splitting the migration of objects into a plurality of phases prior to the optimizing the migration, whereby the migration is optimized for each phase.

In this case, it is preferred that the organizer is adapted to split the migration based on at least one of scheduled start date, object owner, group owner, data type, customer data, and site data.

Preferably, the optimizer is adapted to optimize the migration of data by grouping together objects in migration sets based on the object attributes.

More preferably, the shared infrastructure includes storage media and the migration sets are based on the location of the objects on the storage media, the relationship of the objects to the respective discrete systems, and available access paths for objects from the discrete systems to the shared storage media.

Yet more preferably, objects are ordered sequentially in each migration set based on their locations on the storage media.

It is also preferred that the migration set allows migration of data across parallel data paths.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
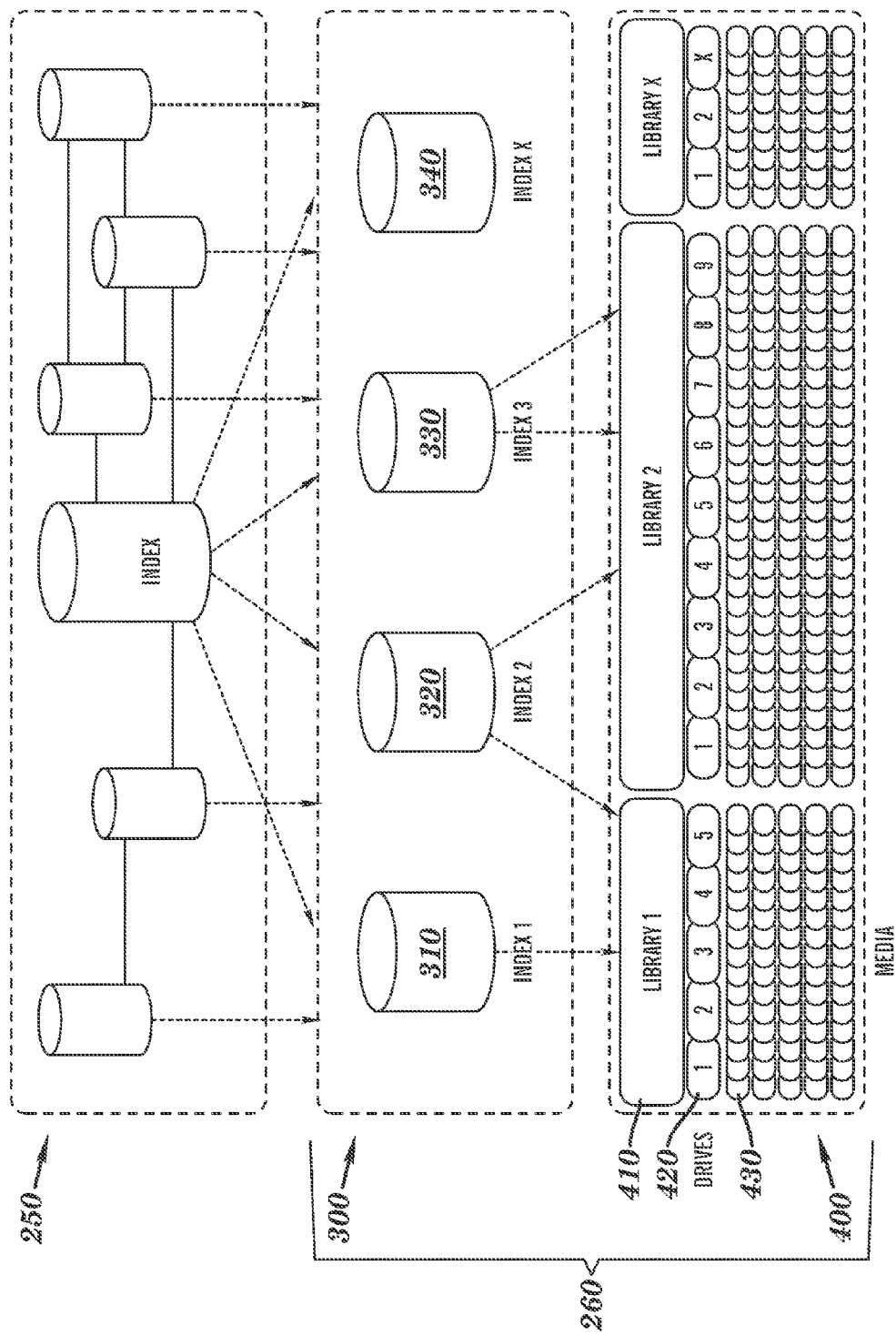
FIG. 1 is a schematic representation of a back up system and a primary storage layer.

FIG. 1 is a simple, exemplary arrangement of the IT architecture of an organization. In the arrangement of FIG. 1, there are provided a plurality of distinct layers, namely a media layer 400, a back up server layer 300, and a primary storage layer 250. The primary storage layer 250 includes a number of networked servers and storage devices, which store and serve data created and used by employees of the organization by means of desktop computers, laptops and other means. The primary storage layer 250 may include those desktop computers, laptops and other means.

The back up server layer 300 includes four back up servers 310, 320, 330, 340 each using different proprietary back up systems—in this example, EMC2®, Tivoli®, Hp®, and Symantec® back up systems. It should be appreciated that these systems are exemplary only and other systems could be used in their place. Each back up server 310, 320, 330, 340 backs data up data from the primary storage layer 250 to a common media layer 400, which includes a plurality of libraries 410. Each library 410 includes a number of tape or other media drives 420 and a number of tapes 430 or other physical media. The loading and unloading of tapes 430 into the drives 420 of a library 410 is automated.

Figure 10:
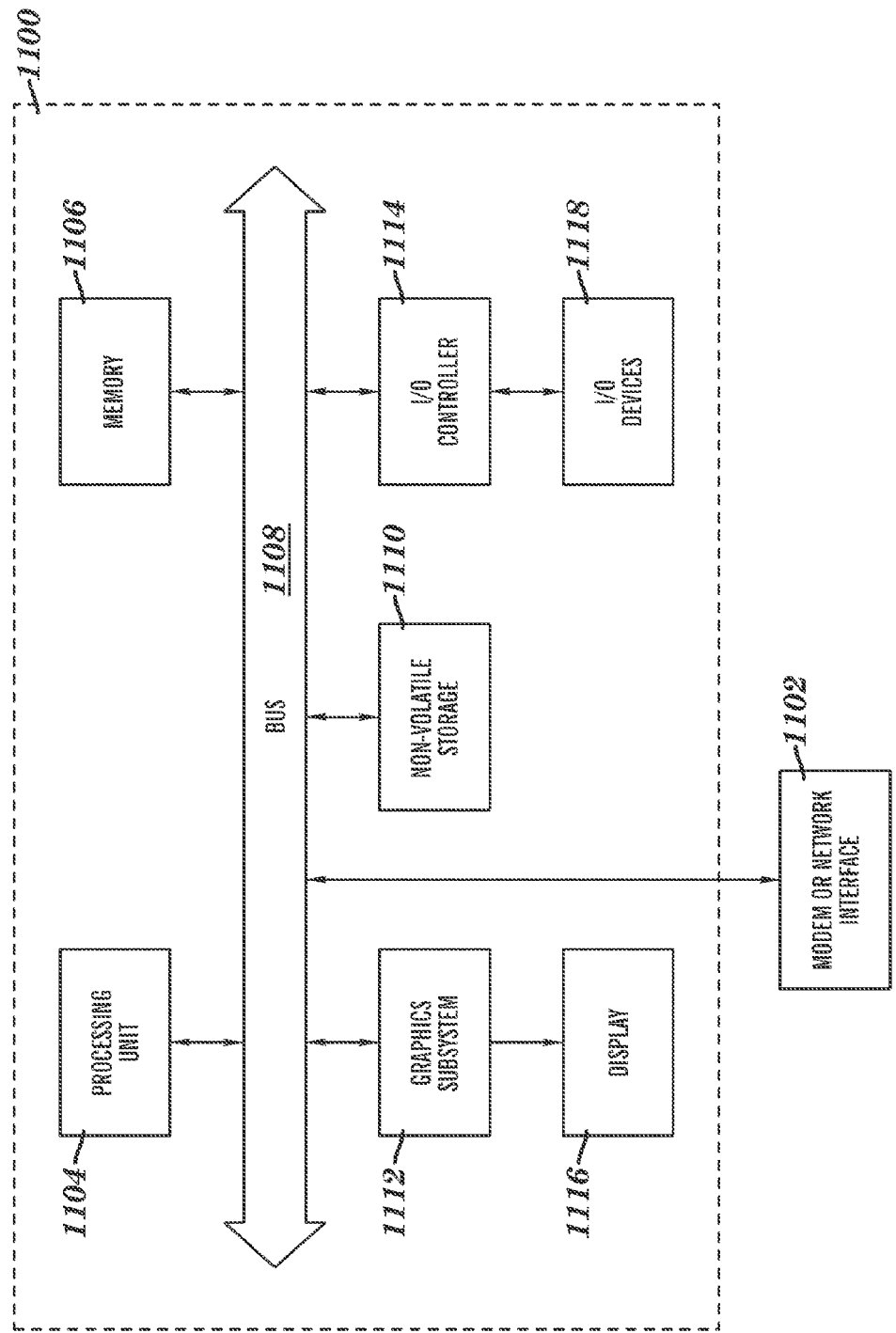
FIG. 10 illustrates an exemplary embodiment of a computer system that may be used in various elements of the present invention.

FIG. 10 illustrates an exemplary computer architecture 1100 by which the back up servers 310-340 may be implemented. Computer architecture 1100 may be or form part of a desktop computer or a laptop computer, a server within the primary storage layer, or any similar computer device, but the back up servers 310-340 are preferably implemented as stand alone servers.

The computer architecture 1100 may interface to external devices such as in the storage media layer 400 and the primary storage layer 250 through a modem or network interface 1102, such as an analogue modem, ISDN modem, cable modem, token ring interface, or satellite transmission interface. As shown in FIG. 10, the computer architecture 1100 includes a processing unit 1104, which may be a conventional microprocessor, such as an Intel Pentium microprocessor, an Intel Core Duo microprocessor, or a Motorola Power PC microprocessor, which are known to one of ordinary skill in the computer art. System memory 1106 is coupled to the processing unit 1104 by a system bus 1108. System memory 1106 may be a DRAM, RAM, static RAM (SRAM) or any combination thereof. Bus 1108 couples processing unit 1104 to system memory 1106, to non-volatile storage 1110, to graphics subsystem 1112 and to input/output (I/O) controller 1114. Graphics subsystem 1112 controls a display device 1116, such as a liquid crystal display, which may be part of the graphics subsystem 1112. The I/O devices 1118 may include one or more of a keyboard, disk drives, printers, a mouse, a touch screen and the like as known to one of ordinary skill in the computer art.

The back up server 310-340 control software will normally be stored on the non-volatile storage 1110. Thus, it may be stored on the machine's hard drive, or possibly on an externally connectable storage medium, such as a USB memory stick or a CD. These two devices would then constitute part of the I/O devices shown as item 1118 in FIG. 10. The non-volatile storage may also store indexing data created by the back up server 40, 45 discussed below.

Each back up server 310, 320, 330, 340 is adapted to write to and read from one or more libraries and stores an index in proprietary format of the data it has stored in the one or more libraries 410.

Together, the back up server layer 300 and the media layer 400 may be considered a source entity 260, the back up servers 310, 320, 330, 340 being discrete systems which share the media layer infrastructure. The present invention is applicable to a situation where it is desired to install a new back up system, which includes a new back up layer and a new media layer. The new back up system may be considered a target entity 280 and it is necessary to migrate the data from the source entity 260 to the target entity 280.

The target entity 280 will also have a back up layer and a media layer and, as the data is migrated across, the back up servers in the target back up layer will create new indexes of data in their own proprietary format(s).

Currently, data is migrated by running through the index stored in each back up server 310, 320, 330, 340 in the source entity 260 in sequential fashion and copying the objects in the order in which they occur in the indexes from the source entity 260, for example the media layer 400, to the target media layer. Thus, migration is handled by building a list of data to be accessed, based on non-media sympathetic parameters. Consequently, migration can be a very laborious process, particularly since objects may be copied in multiple fragments, and the multiple fragments may exist on the same or separate media.

Figure 2:
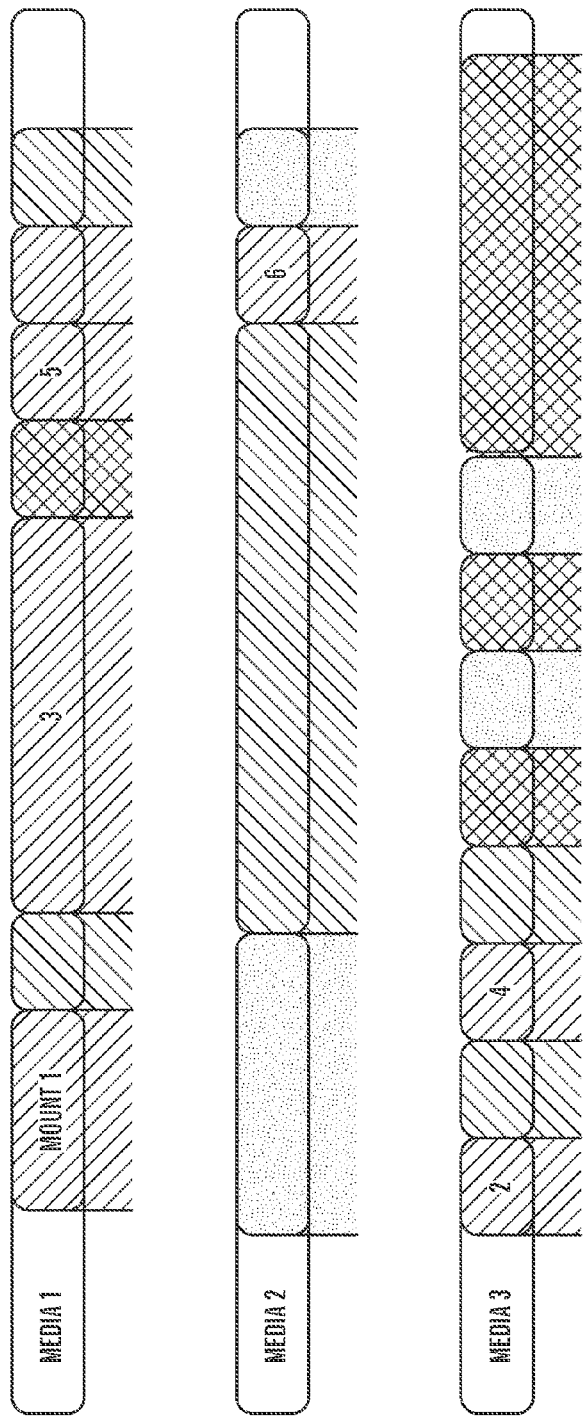
FIG. 2 is a schematic representation of tape mounting operations required to migrate the back up system of FIG. 1 to a target entity according to the prior art.

This is illustrated in FIG. 2, which represents three pieces of tape media with various data objects residing on each tape. The shading represents the order in which data is migrated from the source entity to the target entity. Because objects are listed in the migration list in the sequence they are listed in the indexes of the back up servers 310, 320, 330, 340, the data access to the source entity during migration will follow this order, despite the objects being on separate pieces of media, and some objects being split between media. This requires a large number of mounting and dismounting operations of the tape media on which the various objects are stored.

In FIG. 2, each block represents a data object and the different shadings illustrate the order in which groups of data objects are accessed on the source entity 260 for migration across to the target entity 280. Since the order corresponds to the indexes of the respective back up servers 310, 320, 330, 340, the hatched data showing the first data to be accessed corresponds to the data indexed by the first back up server 310, the hatched data showing the second data to be accessed corresponds to the data indexed by the second back up server 320, the cross-hatched data showing the third data to be accessed corresponds to the data indexed by the third back up server 330, and the dotted data showing the fourth data to be accessed corresponds to the data indexed by the fourth back up server 340.

All data is required to be accessed, and the mount sequence can be seen just for the first data corresponding to the first back up server 310. In this scenario, six mounting operations are required only to migrate the first data across. In particular, media 1 is first mounted, then media 3, then Media 1 again, then media 3 again, then media 1 again and finally media 3. Once the second stage begins for migrating data corresponding to the second back up server 320, the media will be remounted for access. In total, media 1 will be mounted 6 times in the migration operation.

Moreover, in case it is decided to migrate data objects from the indexes of two or more of the first to fourth back up servers simultaneously, there is a high probability of contentious requests from the different back up servers to access data on the same tape 430 at the same time. As discussed above, this can lead to a hung process in which one or more back up servers is waiting for the shared infrastructure to come available to serve its data request. This condition occurs even if there is available infrastructure to access a different piece of eligible data.

This is highly inefficient, and causes significant overhead, particularly in terms of the time, complexity and cost of migrating data across from the source entity to the target entity.

Figure 3:
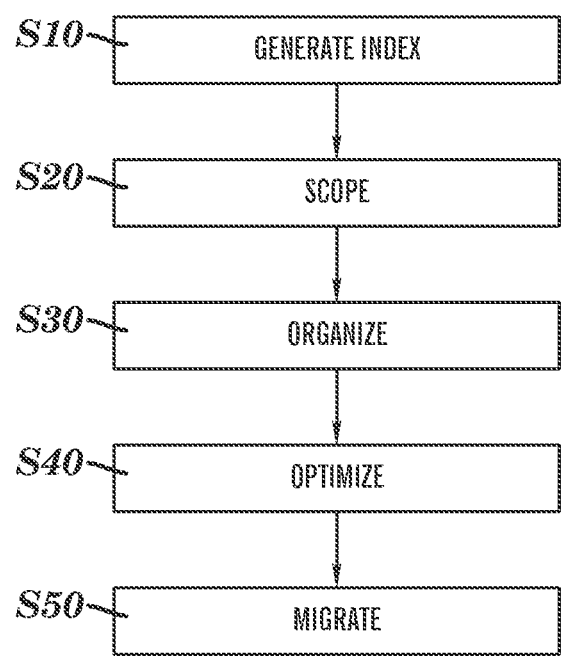
FIG. 3 is a flow diagram showing a migration method according to the present invention.

FIG. 3 is a flow chart of a method of the present invention for addressing these issues. Detailed aspects of the method will be discussed in more detail below. In brief, however, the method includes a first step S10 of creating an index of the data objects stored on the media layer 400. This effectively is an index of the indexes held by the back up servers 310, 320, 330, 340 and the associated shared infrastructure. As will be discussed in more detail below, the index created in step S10 allows an intelligence to remove contention and massively reduce duration of simultaneous data access operations.

In step S20, the index is used to perform a scoping operation in which it is decided which of the data objects need to be migrated to the target entity.

In S30, an organizing operation is carried out in which it decided which stages the data migration should be performed. For example, the organizing operation may be used to split the migration of data into different phases so the data from a first department of the organization is migrated in a first phase and data from a second department is migrated later in a second phase. The organizing operation may also be used to schedule start times for each phase.

Next, an optimization operation is performed in step S40 to group objects into migration sets and reduce the duration of each migration phase.

Finally, the data is migrated in step S50. Specifically the data selected in the scoping step is migrated from the source entity 260 to the target entity 280 based on the migration phases set in the organizing step and the migration sets established in the optimization step.

Figure 4:
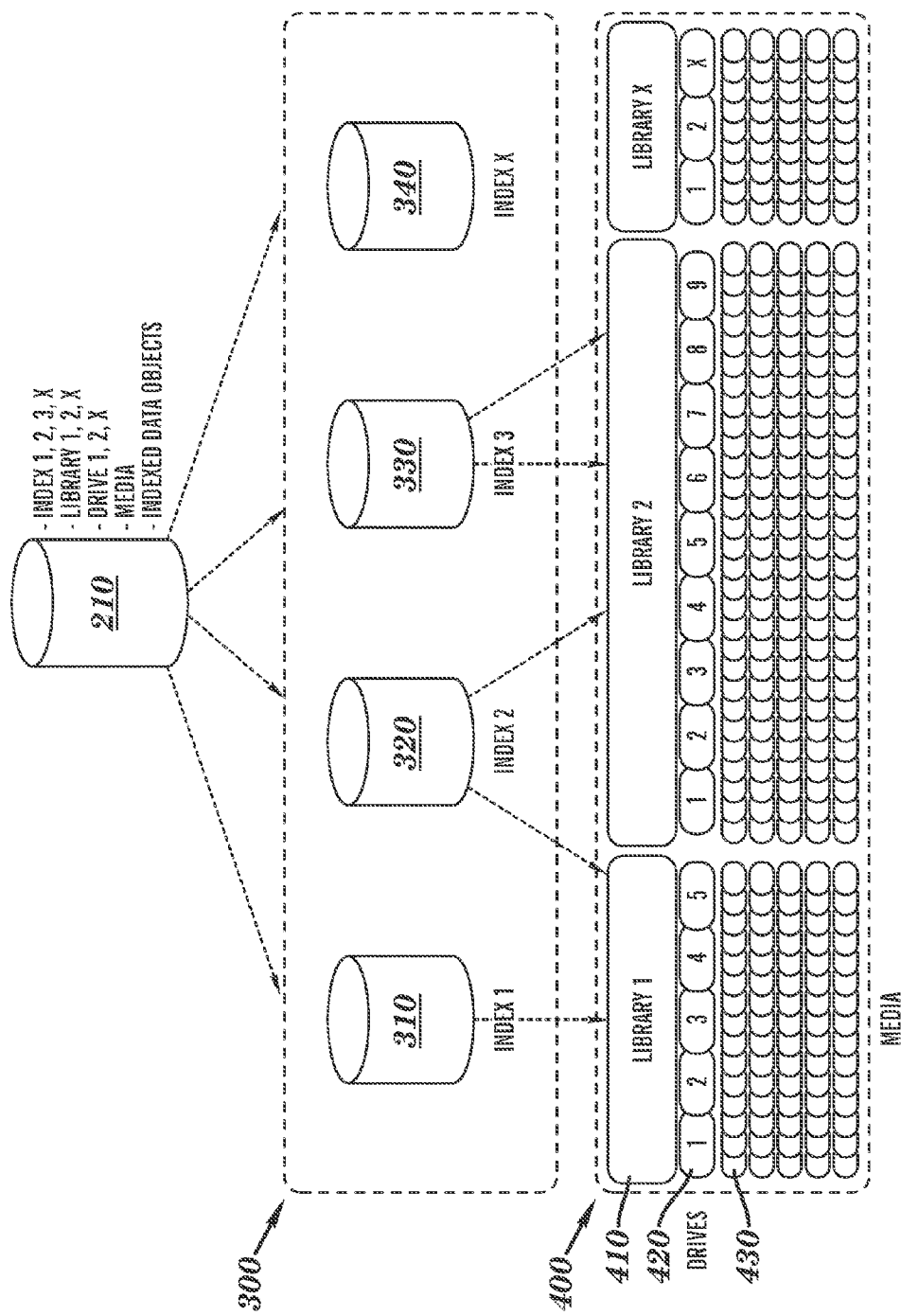
FIG. 4 is a schematic representation of a source entity and an index used in the present invention.

The index and generation of the index will now be described in more detail with reference to FIGS. 4 to 6. As schematically represented in FIG. 4, a single index 210 stores data relating to all of the back up servers 310-340 in the back up server layer 300.

Each of the back up servers 310-340 will schedule the back up of data from the primary storage layer 250 and will store the data in the manner particular to the respective vendor or the respective vendor's product, including manipulation of the backed up data. In particular, each back up server 310-340 will store an index of the data backed up in a format specific to the respective product. The formats vary significantly between vendors, who use different names for similar concepts and also store data and record the storing of data in different ways. The type of information stored in the indexes may also vary depending on the type of physical media.

By contrast, the single index 210 stores information on each of the data objects in a normalized format, irrespective of the native format of the various back up servers 310-320. Effectively, the index 210 is an additional index of indexes using a normalized format. Since the index 210 uses a normalized format, it understands the full infrastructure relationships all the way to the data on the storage resource and can therefore manage the simultaneous access to the infrastructure components to ensure that contention is avoided during a migration or other data mobility operation.

The index 210 can be generated using any suitable means. Preferably, however, the index 210 is generated using respective collectors 220 and importers 230 adapted to interrogate the proprietary back up servers 310, 320, 330, 340, extract predetermined data from them, and translate the extracted data into the normalized format.

Figure 5:
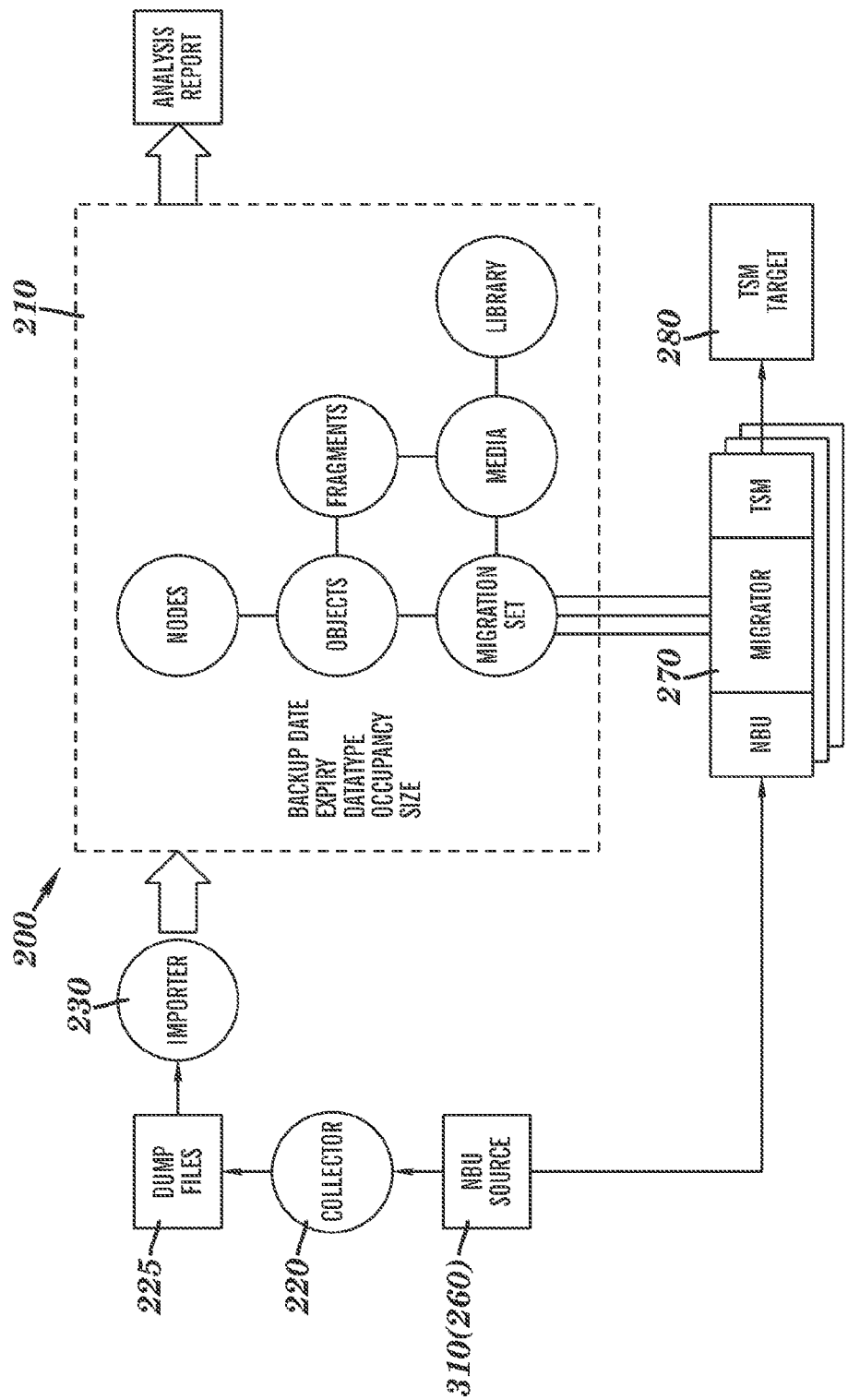
FIG. 5 is a schematic representation showing creation of the index.
Figure 7:
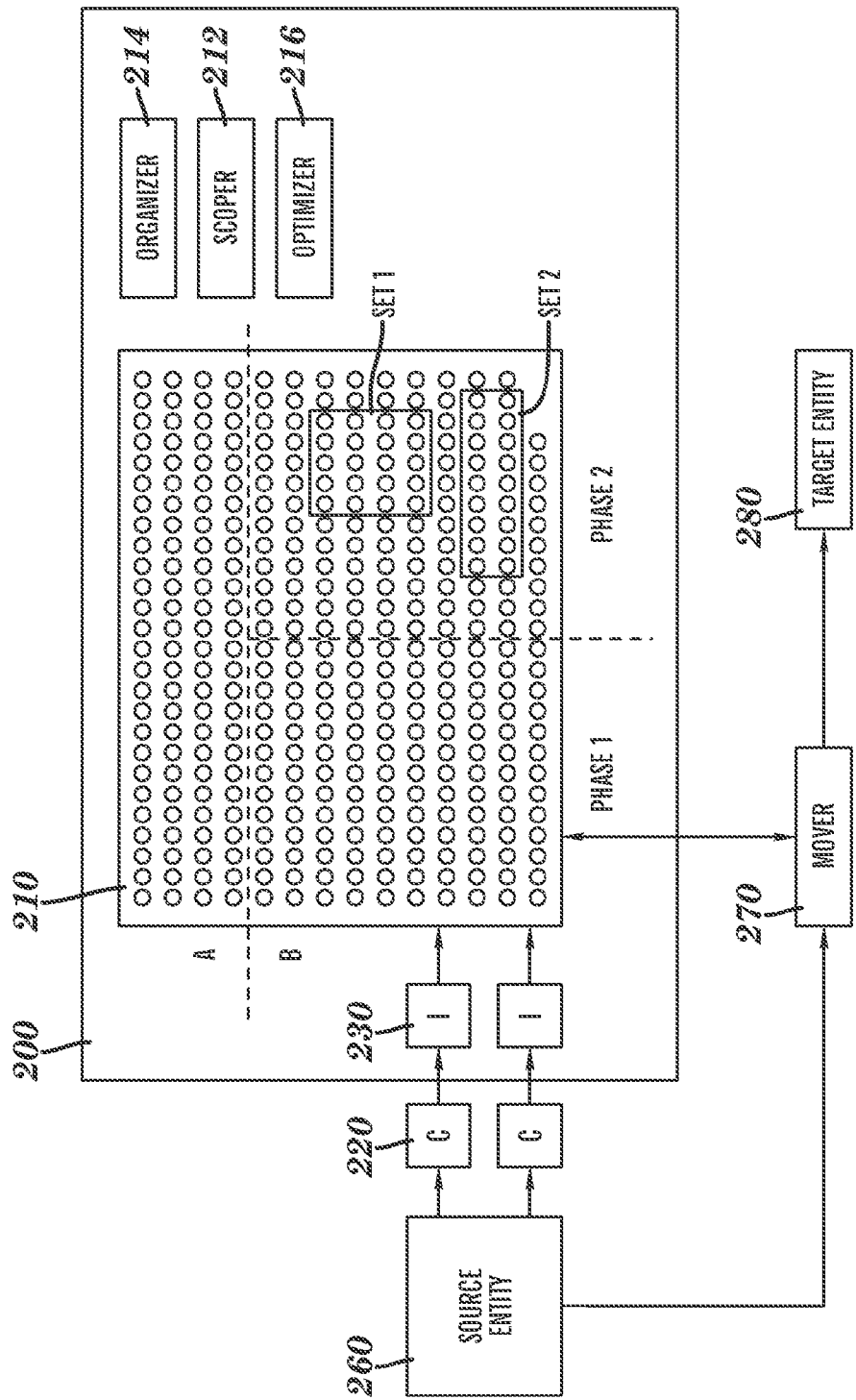
FIG. 7 is a schematic representation of a migration system according to the present invention.

As shown in FIGS. 5 and 7, a data migration system 200 (hereinafter "system") in an embodiment of the invention includes the database or index 210 which stores information on the configuration and state of the back up servers 310-340 shown in FIG. 1, as well as the importers 230. The collectors 220 are shown lying between the system 200 and the source entity 260 in FIG. 7; however they may be included either in the system 200 or the source entity 260. (Indeed, the importers 230 may also be disposed at any of the locations of the collectors 220). The index 210 is populated by running by the collectors 220, which interrogate the back up servers 310-340 through the servers' native interfaces, such as standard command line interfaces of the proprietary back up servers 310-340. In particular, as illustrated in FIG. 5, each collector 220 runs a series of commands (queries) and receives as a result of these commands information from the respective back up server 310-340 in the product specific format and configuration. The collectors 220 generate dump files 225, which contain system configuration and state information in the product specific formats.

The dump files 225 are then processed using importers 230 specifically provided to extract predetermined system configuration and state information deemed important to underpin the required subsequent analysis.

The extracted configuration and state information is translated by the importers 230 from its vendor and product specific format into the normalized format (data model) before being stored in the index 210.

The normalized format (data model) contains all the necessary data points for subsequent analysis in a normalized and consistent manner independent of the mix of vendors' products being analyzed and any products' idiosyncrasies or different ways of expressing its configuration and state.

The index 210 may be stored and accessed using any suitable known means. For example, it may be stored on a server, for example on a hard drive or an array of hard drives. The database server or other storage device may have the same architecture as that shown in FIG. 10. Alternatively, it may distributed and stored across a number of different servers at the same or geographically dispersed locations. The database may be stored on the RAM 1106 or the non-volatile storage 1110 of the server having the architecture shown in FIG. 10.

The collectors 220 may be implemented in hardware, in software or in a combination of hardware and software. Preferably, they are implemented in the form of software either stored on an optical or magnetic medium, or downloaded over a network, such as the Internet. The collectors 220 may be implemented on the hardware of the index 210 or separate hardware. More preferably, they are loaded on a ROM 1110 and implemented in RAM 1106 of the back up servers 310-340. In particular, they may be called by the microprocessor 1104 of the back up servers 310-340 at predetermined times, or on a one off basis. Each collector 220 is adapted to operate with a particular back up server 310-340. Accordingly, different collectors 220 are provided for the different back up servers 310-340, although in alternative embodiments single collector 220 may be adapted to operate on two or more back up servers 310-340. In a further alternative, two or more collectors 220 may be provided for a back up server 310-340.

Similarly, the importers 230 may be implemented in hardware, in software or in a combination of hardware and software. Preferably, they are implemented in the form of software either stored on an optical or magnetic medium, or downloaded over a network, such as the Internet. The importers 230 may be stored on the ROM 1110 and implemented in the RAM 1106 of the back up servers 310-340 or more preferably of the hardware on which the index 210 is stored, or they may be implemented in separate hardware. The importers 230 communicate with the collectors 220 and the hardware storing the index 210 by any suitable means, including a direct connection, or over a network such as the Internet. Each importer 230 is adapted to operate with a particular collector 220. Accordingly, different importers 230 are provided for different collectors 220, although in alternative embodiments a single importer 230 may be adapted to operate with two or more collectors 220, or two or more importers 230 may be adapted to operate with one collector 220.

Figure 6:
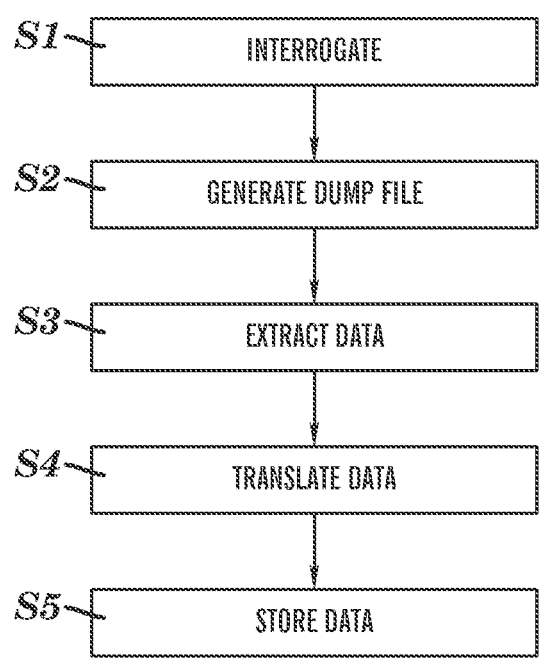
FIG. 6 is flow diagram showing creation of the index.

The index generation process is illustrated in FIG. 6. As shown in step S1, the back up servers 310-340 are interrogated using the collector(s) 220. In particular, using the standard command line interface particular to each respective server 310-340, the collector 220 inputs a series of standard commands understood by the back up servers 310-340. In response to the commands, the back up servers 310-340 output configuration and state information in the format particular to the respective back up servers 310-340. The collector 220 uses the output configuration and state information to generate one or more dump files 225 in step S2, which are passed to and received by (or fetched by) the importer 230. The configuration and state information in the dump files are in the formats used by the back up servers 310-340.

In step S3, the importer 230 extracts predetermined configuration and state information from the dump files 225. The importer 230 is adapted to understand or work with the format of the dump file and so is able to search for and extract the predetermined information in that format. Once extracted, the importer 230 is adapted to translate the format of the extracted data in step S4 to the normalized format used in the index 210 of the present invention.

Finally, in step S5 the importer 230 stores the normalized configuration and state information in the index 210.

It should be appreciated that steps S3 and S4 can be reversed, so that all the data in the dump files 225 is first translated into the normalized format, and the predetermined data is then extracted and stored. However, it is generally more efficient to carry data extraction out first.

The normalized format is a data model adapted to store specific configuration and state data for the back up servers 310-340. In particular, the normalized format includes information about the data stored on the media layer 400 irrespective of the type of media and irrespective of the product types of the back up servers 310-340. The information included in the normalized format includes all information required to carry out data analysis for optimization of the migration process.

The complexity of using shared storage infrastructure with discrete data indexes is apparent from FIG. 1. It can be seen here if the index on back up server 310 and the index on back up server 320 request a piece of data there is potential collision in both the library, drive and media layer. Without the common understanding in the index 210 this can cause a major impact of data access operations. Manual configuration can attempt to hard code infrastructure to the indexes, however this results in more inefficiency. The index 210 of indexes and associated infrastructure brings the combined intelligence to deal with this complexity, as described below.

The scoping, optimizing and organizing steps will now be described in more detail, with reference to FIG. 7, which shows the system 200 according to the present invention together with the source entity 260 and the target entity 280. In the system 200, there is provided the database or index 210, a scoper module 212, an organizer module 214 and optimizer module 216. The system 200 may be provided in a stand alone server or other computer having an architecture as shown in FIG. 10. In particular, the index 210 may be stored on the non-volatile storage 1110 and partially called by the processor 1104 as required. Each of the scoper module 212, organizer 214 and optimizer 216 may be provided in software or hardware. Preferably, each is provided as software stored on the non-volatile storage 1110 and operated by the processing unit 1104 using the RAM 1106. The system 200 is also shown as including one or more importers 230, although these may be provided externally, as previously described. It should be appreciated that any two or more of a collector 220, importer 230, scoper module 212, organizer 214, optimizer 216 and mover 270 (described below) may be implemented in the same module. Alternatively, any or all these modules may be provided on separate hardware to the hardware on which the index 210 is provided. That is, system 200 may be physically distributed.

The scoper module 212 carries out the scoping of step S20 of the data to be migrated based on a number of meta data policies. The metadata policies may be preprogrammed in the scoper module 212, manually input by a user via an I/O device 1118 and the I/O controller 1114, or more preferably a combination of the two. The provision and use of the scoper module 212 allows the method of the present invention to be capable of coping with many millions of individual objects. The scoping allows the mass-application of a mobility decision based on a number of key attributes, for example, owner (customer), group owner, data type, expiration and so on. Once the key attributes have been selected and the metadata policies finalized, the data objects having attributes matching the metadata policies are marked as eligible for migration.

In FIG. 7, the index 210 includes details of a plurality of objects, represented by circles. Objects A above the horizontal line fail to meet any of the criteria for data migration, for example because they belong to a group within the organization whose data is not being migrated, they belong to a different organization (customer), they have expired and no longer need to be backed up and so on. By contrast, objects B below the line meet metadata policies and are marked as eligible for migration. Scoping may also be termed selecting.

The organizer 214 carries out the organizing of step S30 of the data marked eligible for migration. This allows the data mobility to be broken into discrete phases, based on a scheduled start date. The organizer 214 may also allow the input of external factors such as business requirements to dictate the schedule of data access. As an example, the organizer 214 can be used to migrate data belonging to the accounts department of an organization in a first phase and to migrate the data belonging to the engineering department in a second phase. Thus, FIG. 7 shows the objects selected for migration in the scoping step split into two phases. In this schematic representation, data objects to the right of the vertical line are migrated in a first phase and data objects to the left are migrated in a second phase. The organization step S30 "overrides" the optimization step S40, as optimization is carried out within the phases created in the organization stage. The mathematically most efficient configuration of phases for the optimization stage is to have only one phase configured.

In the subsequent optimization step S40, logic is applied by the optimizer 216 to accelerate the data migration from the source entity 260 to the target entity 280. Using the index 210, it is possible to understand all data that is in the scope of each migration phase, as well as all the relationships to the underlying technology that is used to access the data. In particular, it is possible to understand for all objects where they are stored in the media layer 400 and how they are accessed, irrespective of the proprietary technology of the back up server 310-340 used to store it.

To reduce the duration of each migration phase, the optimizer 216 groups together data objects by a number of attributes to remove any contention from the migration and massively reduce the number of physical tape operations by making use of tapes whenever they are available. The index groupings of data are known as migration sets. In FIG. 7 the optimizer 216 has so far grouped the objects to be migrated in phase 1 into two migration sets. Each migration set contains data objects that exist on the same media location and have a known infrastructure access path. The migration sets are built so that migration of two or more migration sets can be run in parallel without creating an infrastructure collision thereby making use of the tapes whenever available to reduce tape mounts. This means that when media is loaded all data can be extracted without remounts and re-access of the media later in the process. Thus, each migration set is optimized for the reduction of tape overheads and the migration sets can be executed together to drive up aggregate utilization and therefore reduce the total duration of the data access during migration.

Because the index 210 is in a normalized format, the optimizer 216 can be used across different types of media and different types of media management of backup software managing the respective data indexes of the various back up servers 310-340.

Following the optimization step S40, the index 210 effectively stores all required data movement operations, although the data movement operations may also be stored in a separate database. These data movement operations are used to control subsequent migration of the data in step S50 from the source entity 260 to the target entity 280 by any suitable means. Preferably, a data mover 270 is used, as shown in FIG. 7.

Preferably, the data movement operations have been mathematically created and processed, preferably each with a number of attributes such as source location, target destination, platform type and data type. These attributes are tagged to every migration operation, meaning that there is metadata controlling each data operation. The migration operations are then entered as eligible operations on the index, effectively marking each migration operation as a piece of work that should be completed by the data mover 270.

In other words, the index 210 stores an array of migration operations in a normalized data model. The data mover 270 converts migration operations into the appropriate source and target languages. A separate data mover 270 may be provided for each combination of source language and target language. For example, based on a migration operation in the index 210, the data mover 270 may produce a request to retrieve data in the language of back up server 310 in the source entity and send the request to back up server 310, to which the data mover 270 is connected. The data mover 270 thereby retrieves the relevant data object from the back up server 310. It then provides any conversion necessary into the language of a target back up server in the target entity 280 and stores the data object at the assigned location in the media layer of the target entity 280 using the target back up server in the source entity.

The mover 270 is shown as separate from the system 200 in FIG. 7, but may form part of the system and be implemented on the same hardware, or physically linked hardware at the same location. Alternatively, it may be provided on separate hardware at a remote location (or the same location as one or both of the source and target entities 260, 280 but remote from the system 200) and networked to the migration system for example over the Internet.

Accordingly, in the system and method of the present invention, the new index 210 holds within it all the relationships from the data object up through the available access paths and ultimately the requesting index. These available data paths allow the decision making process carried out by the optimizer 216 to build each migration set across only the limitation of available data paths for access to the individual media items. The data being requested can also again be parallelized due to knowledge of the data media location and the available data paths available to service this access. Running the optimizer 216 across the widest possible phases created by the organizer 214 gives the optimization of as many available data paths as possible within the limitations of the shared infrastructure (namely the media layer 400). These available data paths are then used to make best use of tapes when they are available to reduce the duration of the operation.

As the optimizer 216 understands the positions of the data on the physical tape media 430, sequential objects to be migrated in terms of their location on the physical tape media 430 are ordered sequentially in the migration phase. This means that after a first object has been requested for access and migration, when the second object is requested for access, the tape media is already mounted and online as opposed to being de-staged into a near-line state. This avoids mount operations each time a new object is requested through the standard indexes. Effectively, the optimizer 216 provides a pre-fetch function to ensure the physical operations are kept to as few as possible to service data access requests.

These two features of using as many data paths as possible and ordering objects in the migration phase based on their physical location on the media ensures that multiple streams can be executed with no media or infrastructure contention, and that when the migration stream has begun it is as efficient as possible within the bounds of the migration phase.

Figure 8:
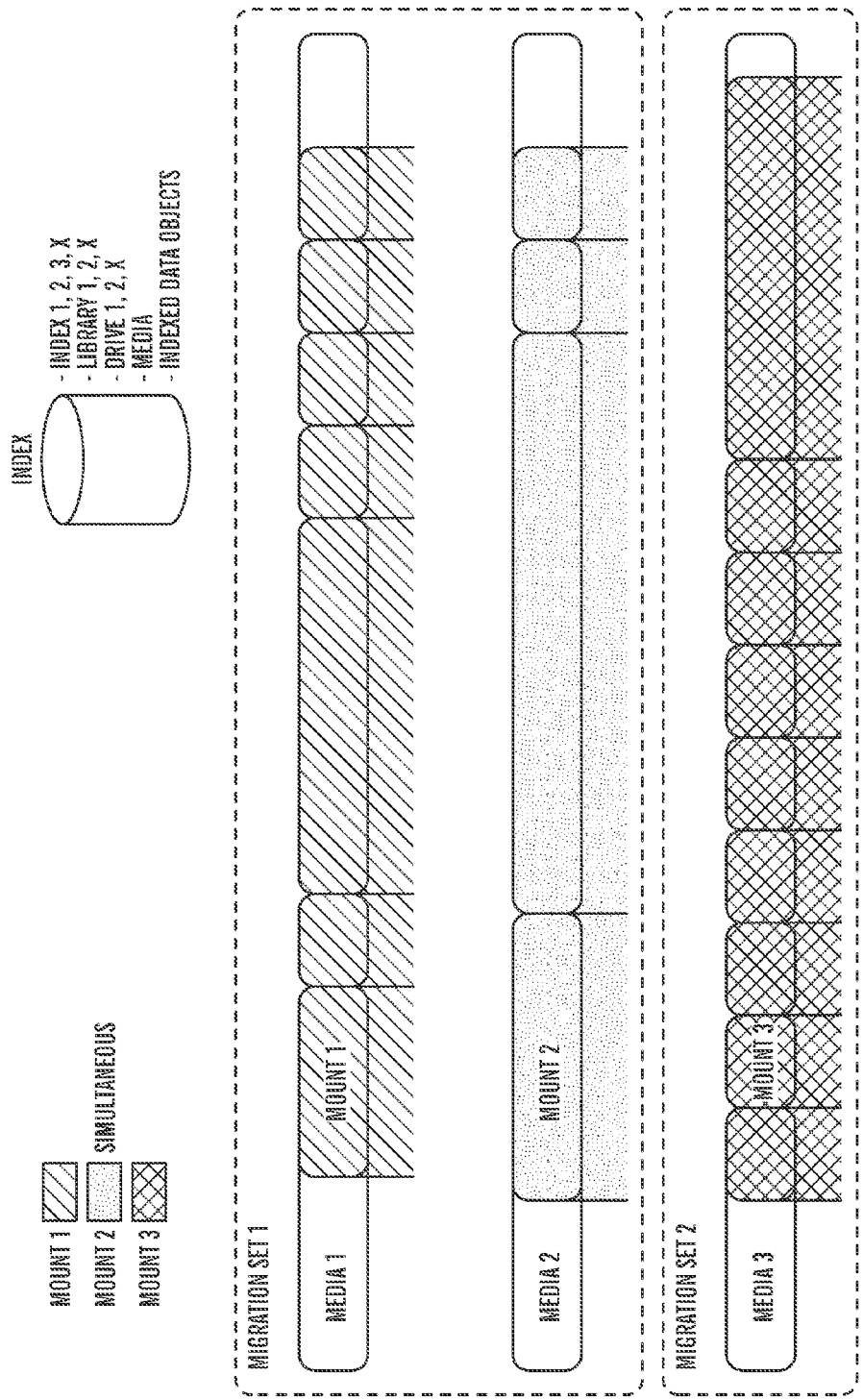
FIG. 8 is a schematic representation of tape mounting operations required to migrate the back up system of FIG. 1 to a target entity according to the present invention.

With the addition of the extra index 210, which provides information on data object location and infrastructure components, it is possible to significantly reduce the amount of media overhead for all of the data in scope of access. It also means there are simultaneous operations as opposed to the sequential nature of a traditional model. Accordingly, FIG. 8 shows the tape mounting operations required to migrate the data on the three pieces of media shown in FIG. 2. A comparison of these two figures shows the same data objects in the same physical locations on the three media. Again, the different shadings illustrate the order in which groups of data objects are accessed on the source entity 260 for migration across to the target entity 280. However, this time the order does not correspond to the indexes of the respective back up servers 310, 320, 330, 3340, but rather to the order of the objects in the migration sets. Thus, in migration set 1, media 1 and media 2 are mounted simultaneously and the data objects on them are simultaneously streamed across to the target entity 280.

In this case, each media will be mounted only once in the migration operation, leading to a total of just three mount operations to stream all the data across in the migration operation of a phase.

Accordingly, from this basic example, it can be seen how the present invention simplifies data migration. However, it must further be borne in mind that the arrangement of data objects into migration sets in which there is no contention between data access paths avoids hung processes, thereby reducing the time taken to migrate the data.

For large datasets in complex environments, the present invention represents a huge improvement on current non-intelligent technology by the addition of an additional index 210 and a manipulation using the scoper module 212, organizer 214 and optimizer 216 for large data access operations. It ensures parallelization of processes without infrastructure request collisions and provides an improvement of the efficiency of reading disparate objects from sequential access media types. Thus, the present invention massively simplifies the aggregate data move, hugely improves performance and very significantly reduces both migration duration and operational wear on physical components.

Figure 9:
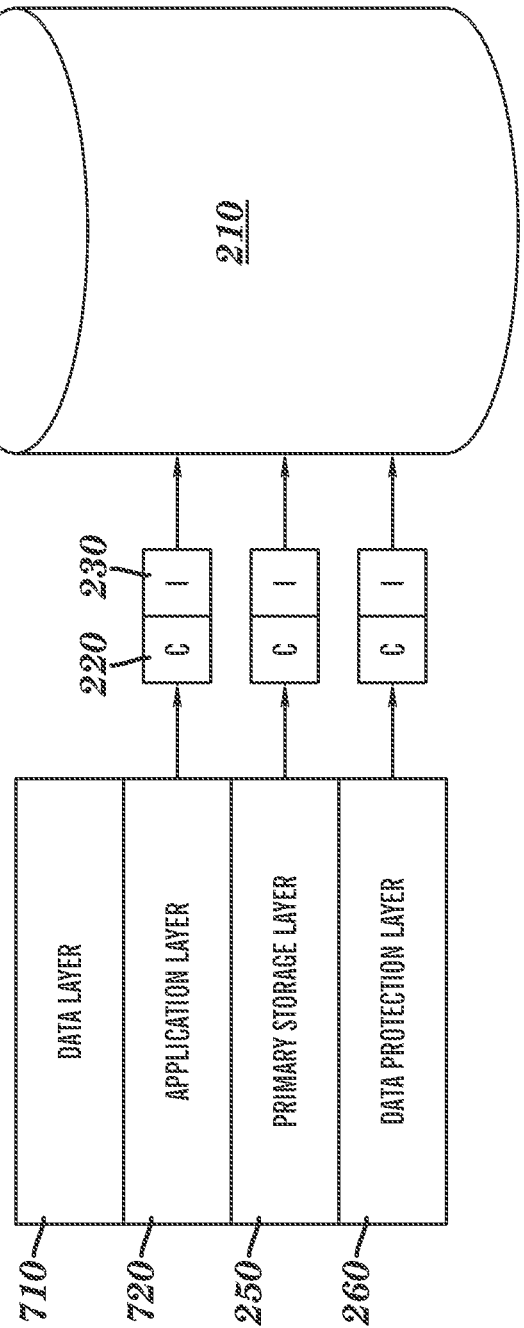
FIG. 9 is a schematic representation of a system and method according to a further aspect of the present invention.

It is important to realize that this concept can be applied to any requirement where large numbers and scale of objects need to be managed and mobilized. Thus, the present invention is suitable for application not only to migration of data between legacy and new back up servers and systems in a data protection layer 260, but also for the migration of data from a source primary storage layer 250 to a target primary storage layer, or even from the application layer 720 and the raw data layer 710 above that. This is schematically illustrated in FIG. 9 by the provision of collectors 220 and importers 230 to create an index 210 for one or more of the different layers.

The present invention is also applicable to the acceleration of accesses to traditional tape infrastructure; the acceleration of big data mobility and access; and to pre-fetch and acceleration of data access on near-line technology. Thus, "migrate", "migration" and like terms should be interpreted broadly to cover any form of transfer of data, and is not limited to migration of the sort that occurs when organizations or individuals change computer systems or upgrade to new systems, or when systems merge (such as when the organizations that use them undergo a merger or takeover). As such, the source entity need not be a back up system but may be a primary storage layer 250 system including discrete systems that share infrastructure, and the target entity may be another computer sitting above and networked to the primary storage layer 250.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A data migration method for migrating data objects from a source entity to a target entity, wherein the source entity comprises an infrastructure shared between discrete systems, the method comprising:
    providing a single index of the data objects stored on the shared infrastructure and object attributes of the data objects, the index being provided in a normalized format independent of native formats of the discrete systems;
    selecting which of the data objects to migrate based on at least one object attribute;
    splitting the migration of the selected data objects into a plurality of phases, each of the selected data objects is assigned to one of the plurality of phases, and the selected date objects of one phase are migrated at a different time than the selected data objects of another phase;
    optimizing the migration of the selected data objects from the shared infrastructure to the target entity by grouping the selected data objects of each phase into migration sets based on the object attributes; and
    migrating the selected data objects from the source entity to the target entity based on the migration phases established during splitting and the migration sets established during optimizing.

2. The data migration method according to claim 1, wherein the at least one object attribute used for selecting which data objects to migrate is one of object owner, group owner, data type, and expiration.

3. The data migration method according to claim 1, wherein the object attributes comprise at least one of customer data, site data, source data, node data, object data and fragment data.

4. The data migration method according to claim 1, wherein the shared infrastructure comprises storage media and the migration sets are based on the location of the selected data objects on the storage media, the relationship of the selected data objects to the respective discrete systems, and available access paths for the selected data objects from the discrete systems to the storage media.

5. The data migration method according to claim 4, wherein the selected data objects are ordered sequentially in each migration set based on their locations on the storage media.

6. The data migration method according to claim 1, wherein providing the single index of the data objects stored on the shared infrastructure and object attributes of the data objects comprises:
    interrogating storage devices of the shared infrastructure using the standard command line interface particular to each respective storage devices;
    extracting predetermined data from the storage devices; and
    translating the extracted predetermined data into a normalized format.

7. The data migration method according to claim 1, wherein providing the single index of the data objects stored on the shared infrastructure and object attributes of the data objects comprises:
    generating dump files which contain predetermined system configuration and state information in product specific formats by interrogating storage devices of the shared infrastructure;
    extracting the predetermined system configuration and state information from the dump files; and
    translating the extracted predetermined system configuration and state information from the product specific formats into a normalized format.

8. A data migration system for migrating data objects from a source entity to a target entity, wherein the source entity comprises an infrastructure shared between discrete systems, the system comprising:
    one or more computer processors, one or more computer-readable storage media, and program instructions stored on one or more of the computer-readable storage media for execution by at least one of the one or more processors, the program instructions comprising:
    program instructions to store a single index of the data objects stored on the shared infrastructure and object attributes of the data objects, the index being in a normalized data model independent of native formats of the discrete systems;
    program instructions to select which data objects to migrate based on at least one object attribute; and
    program instructions to split the migration of the selected data objects into a plurality of phases, each phase has a different scheduled start time, each of the selected data objects is assigned to one of the plurality of phases, and the selected date objects of one phase are migrated at a different time than the selected data objects of another phase
    program instructions to optimize the migration of the selected data objects from the shared infrastructure to the target entity by grouping the selected data objects of each phase into migration sets based on the object attributes.

9. The data migration system according to claim 8, wherein the at least one object attribute used to select which data objects to migrate is one of object owner, group owner, data type, and expiration.

10. The data migration system according to claim 8, wherein the object attributes comprise at least one of customer data, site data, source data, node data, object data and fragment data.

11. The data migration system according to claim 8, wherein the shared infrastructure comprises storage media and the migration sets are based on the location of the selected data objects on the storage media, the relationship of the selected data objects to the respective discrete systems, and available access paths for the selected data objects from the discrete systems to the storage media.

12. The data migration system according to claim 11, wherein the selected data objects are ordered sequentially in each migration set based on their locations on the storage media.

13. The data migration system according to claim 11, wherein the migration set allows migration of the selected data objects across parallel data paths.

14. A method comprising:
providing a single index of the data objects stored on the shared infrastructure and object attributes of the data objects, the index being provided in a normalized format independent of native formats of the discrete systems;
selecting which of the data objects to migrate based on at least one object attribute;
optimizing the migration of data from the shared infrastructure to the target entity;
splitting the migration of the selected data objects into a plurality of phases, each of the selected data objects is assigned to one of the plurality of phases, and the selected date objects of one phase are migrated at a different time than the selected data objects of another phase; and
optimizing the migration of the selected data objects from the shared infrastructure to the target entity by grouping the selected data objects of each phase into migration sets based on the object attributes.

15. The method according to claim 14, wherein the at least one object attribute used for selecting which objects to migrate is one of object owner, group owner, data type, and expiration.

16. The method according to claim 14, wherein the object attributes comprise at least one of customer data, site data, source data, node data, object data and fragment data.

17. The method according to claim 14, wherein the shared infrastructure comprises storage media and the migration sets are based on the location of the selected data objects on the storage media, the relationship of the selected data objects to the respective discrete systems, and available access paths for the selected data objects from the discrete systems to the storage media.

18. The method according to claim 14, wherein the selected data objects are ordered sequentially in each migration set based on their locations on the storage media.

19. The method according to claim 14, wherein providing the single index of the data objects stored on the shared infrastructure and object attributes of the data objects comprises:
interrogating storage devices of the shared infrastructure using the standard command line interface particular to each respective storage devices;
extracting predetermined data from the storage devices; and
translating the extracted predetermined data into a normalized format.

20. The method according to claim 14, wherein providing the single index of the data objects stored on the shared infrastructure and object attributes of the data objects comprises:
generating dump files which contain predetermined system configuration and state information in product specific formats by interrogating storage devices of the shared infrastructure;
extracting the predetermined system configuration and state information from the dump files; and
translating the extracted predetermined system configuration and state information from the product specific formats into a normalized format.

* * * * *